US005674050A

United States Patent [19]
Hall et al.

[11] Patent Number: 5,674,050
[45] Date of Patent: Oct. 7, 1997

[54] TURBINE BLADE

[75] Inventors: Kenneth B. Hall, Jupiter; Thomas A. Auxier, Palm Beach Gardens, both of Fla.

[73] Assignee: United Technologies Corp., Hartford, Conn.

[21] Appl. No.: 279,632

[22] Filed: Dec. 5, 1988

[51] Int. Cl.$^6$ ........................................ E01D 5/18
[52] U.S. Cl. .............................. 416/97 R; 416/97 A
[58] Field of Search ........................ 416/97 R, 97 A

[56] References Cited

U.S. PATENT DOCUMENTS

| | | | |
|---|---|---|---|
| 4,073,599 | 2/1978 | Allen et al. | 416/97 R |
| 4,257,737 | 3/1981 | Andress et al. | 416/97 R |
| 4,484,859 | 11/1984 | Pask et al. | 416/97 R |
| 4,514,144 | 4/1985 | Lee | 416/97 R |
| 4,820,123 | 4/1989 | Hall | 416/97 R |

FOREIGN PATENT DOCUMENTS

| | | | |
|---|---|---|---|
| 0167806 | 10/1983 | Japan | 416/97 R |
| 0170801 | 10/1983 | Japan | 416/97 R |

*Primary Examiner*—Michael J. Carone
*Assistant Examiner*—Christopher K. Montgomery
*Attorney, Agent, or Firm*—Norman Friedland

[57] ABSTRACT

A bulkhead in the form of a rib extending spanwise adjacent the leading edge of the airfoil of a turbine blade of a gas turbine engine serves to stiffen the airfoil to attain protection from impact by foreign objects, but doesn't materially affect cooling effectiveness in the event of a puncture of the skin. Holes extending spanwise in the rib reduce the mass, allow radial flow, and restrict flow into the leading edge. This construct allows a reduction in the thickness of the skin of the airfoil, and hence a weight reduction.

2 Claims, 1 Drawing Sheet

TURBINE BLADE

This invention was made under a Government contract and the Government has rights therein.

DESCRIPTION

1. Technical Field

This invention relates to gas turbine engines and particularly to the construction of turbine blades.

2. Background of the Invention

With the advent of high speed aircraft and the necessity of attaining improvements in the thrust-to-weight ratio of the engine, there has been a concerted effort to reduce the overall weight of the engine. To this end, it has become desirable to make the walls of the airfoil section of the turbine thinner than heretofore while at the same time eliminating some of the structural ribs. While these aspects are being mandated, it still is a necessity to attain a high resistance to damage from foreign objects while minimizing impact to cooling effectiveness and weight.

To obviate the impact problem enumerated above, we provide a bulkhead strategically located in the airfoil section of the turbine so as to increase the blade's stiffness and enhance its ability to resist damage occasioned by impact by foreign objects. It is also contemplated by virtue of this invention that in the eventuality the skin of the airfoil is penetrated, the strategically located bulkhead will be designed with the requisite dimensioned holes that will reduce the effect that the leakage caused by penetration will have on the internal cooling effectiveness in the remaining portion of the airfoil.

DISCLOSURE OF THE INVENTION

An object of this invention is to provide a stiffener for a turbine airfoil section, particularly for the downstream stages, that allows the use of thinner airfoil skin and reduced number of supporting ribs that have been employed heretofore, so as to resist damage from foreign objects while minimizing the impact to cooling effectiveness and weight.

A feature of this invention is to provide a bulkhead extending between the pressure and suction sides of the airfoil and extending spanwise from the root to the tip of the blade adjacent the leading edge and having spaced apertures dimensioned to reduce its mass to allow radial flow, whether or not a shower head is employed, and to restrict flow into the leading edge in the event a hole is punched in the skin.

The foregoing and other features and advantages of the present invention will become more apparent from the following description and accompanying drawing.

BEST MODE FOR CARRYING OUT THE INVENTION

For the sake of simplicity and convenience, some of the details of the internal structure of the air cooled turbine blade is omitted herefrom, but it is to be understood that the particular means used to enhance heat transfer is not deemed part of this invention. For examples of typical turbine blade cooling schemes, reference is hereby made to U.S. Pat. Nos. 3,533,711 granted to D. M. Kercher on Oct. 13, 1970, 4,278,400 granted to G. J. Yamarik et al on Jul. 14, 1981, 4,601,638 granted to E. C. Hill et al on Jul. 22, 1986, and 4,474,532 granted to M. J. Pazder on Oct. 2, 1984, the latter three patents being assigned to United Technologies Corporation, the assignee of this patent application, and all of which are incorporated herein by reference.

Figure 1:
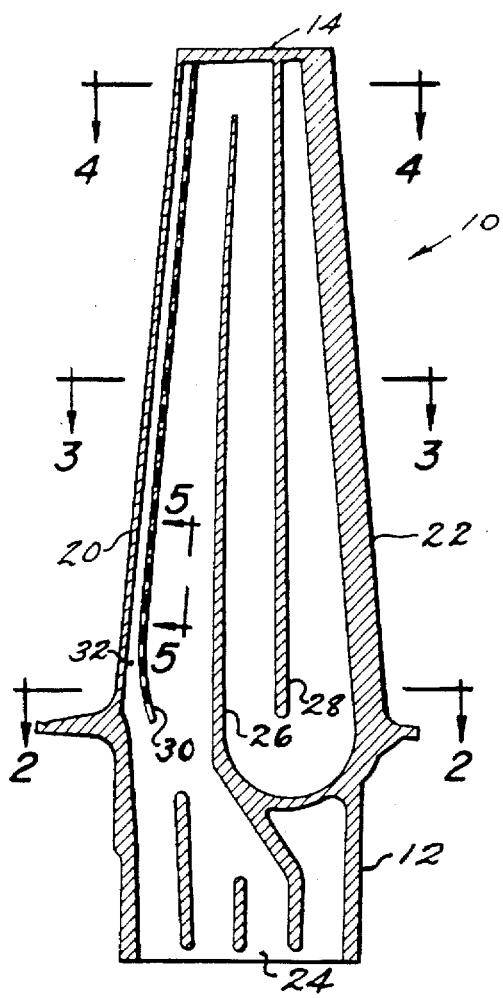
FIG. 1 is a sectional view extending spanwise through the blade of a turbine of a gas turbine engine.
Figure 4:
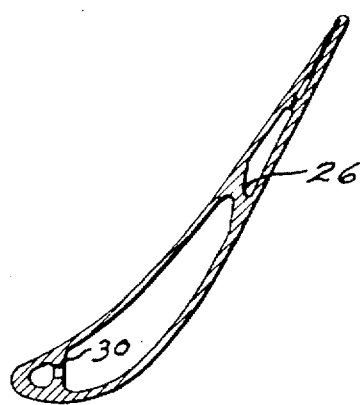
FIG. 4 is a sectional view taken along lines 4—4 of FIG. 1.
Figure 3:
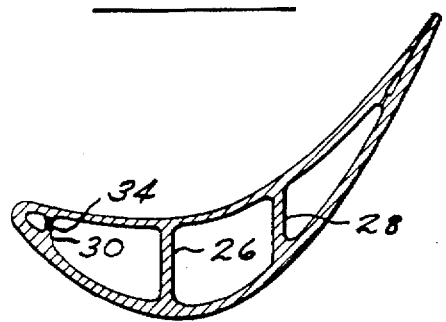
FIG. 3 is a sectional view taken along lines 3—3 of FIG. 1.
Figure 2:
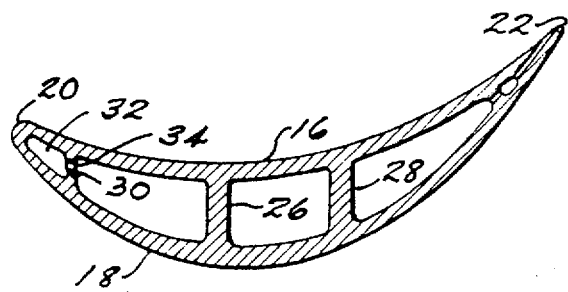
FIG. 2 is a sectional view taken along lines 2—2 of FIG. 1.
Figure 5:
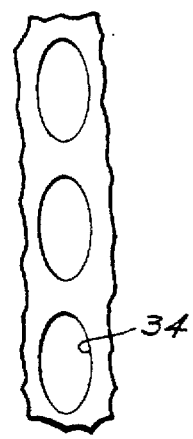
FIG. 5 is a cutaway looking at the side surface of the bulkhead denoted by lines 5—5 of FIG. 1.

As can be seen from FIGS. 1–5, the turbine blade generally indicated by reference numeral 10 comprises a root section 12, a tip section 14, a pressure surface 16, a suction surface 18, a leading edge 20 and trailing edge 22. As is typical in internally cooled turbine airfoils, cooling air is admitted into opening 24 formed at root 12 and flows radially to the tip while a portion is discharged through film cooling and convective cooling holes (not shown) in a conventional manner. It is also typical to divide the airfoil into different compartments or cavities for defining specific cooling functions. The spanwise rib 26 serves to define a serpentine passageway for directing the flow in a particular manner and attaining a given residence time for the cooling air. Rib 28 likewise extends spanwise and also divides the airfoil into different cooling compartments; it, like rib 26, serves to provide some structural support for the outer skin of the airfoil. However, this design differs from many airfoil sections in that it carries a minimum number of ribs. The skin of the airfoil is made relatively thin so as to attain a reduction in blade weight.

According to this invention a bulkhead consisting of rib 30 extends from adjacent the root section 12 to the tip 14 and extends from the pressure side 16 to the suction side 18. The rib 30 is positioned in such a manner that all of the expected impacts will occur on or forward of the rib. The rib defines a spanwise extending cavity 32 and is open-ended at the root section and extends as far down the airfoil as impacts are expected to be a problem. The holes 34 in the rib serve to reduce the mass of the rib, to allow radial flow with or without a showerhead, and to restrict flow into the leading edge in the event a hole is punched. Flow is radial on both sides of the bulkhead. At the bottom of the rib, there is no pressure ratio across the rib. At the top of the rib, a small pressure ratio may be generated by flow towards the leading edge if there is a showerhead, or flow rearwards if there is no showerhead. Little or no extra coolant pressure is required by the feature. Producibility problems are avoided because of the many large cross-over holes 34 through the bulkhead. The holes 34 also reduce the density of the rib, which minimizes the additional stress.

Although this invention has been shown and described with respect to detailed embodiments thereof, it will be understood by those skilled in the art that various changes in form and detail thereof may be made without departing from the spirit and scope of the claimed invention.

We claim:

1. A turbine blade for a gas turbine engine subjected to high temperatures, said blade having a metallic sheath defining an airfoil section and having internal passageways for receiving and discharging cooling air for maintaining said turbine blade within tolerable temperature limits so as to maintain structural integrity, said airfoil section having a leading edge, a trailing edge, a tip section, a root section, a suction side and a pressure side, said metallic sheath being fabricated from relatively thin material such that the material is susceptible to puncturing when impacted by foreign objects, and being susceptible of leaking cooling air to the detriment of said turbine blade, means for stiffening said sheath so as to be structurally viable and for protecting it against said leaking cooling air, said means includes a radial extending rib internally of said sheath and extending from said tip section to said root section and bearing against said suction side and said pressure side and defining a pair of radially extending subchambers in said sheath for receiving cooling air from said root section, and said rib having a plurality of radially spaced apertures interconnecting said pair of subchambers and substantially no pressure drop being across said apertures.

2. A turbine blade as in claim 1 wherein said rib is adjacent said leading edge.

* * * * *